(12) United States Patent
Toscano

(10) Patent No.: US 10,154,159 B2
(45) Date of Patent: *Dec. 11, 2018

(54) SYSTEM, METHOD, AND APPARATUS FOR AN INTERACTIVE VIRTUAL FAX MACHINE

(71) Applicant: Open Text Holdings, Inc., San Mateo, CA (US)

(72) Inventor: Francis Toscano, Kendall Park, NJ (US)

(73) Assignee: Open Text Holdings, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,797

(22) Filed: Apr. 3, 2017

(65) Prior Publication Data

US 2017/0208190 A1 Jul. 20, 2017

Related U.S. Application Data

(63) Continuation of application No. 14/841,454, filed on Aug. 31, 2015, now Pat. No. 9,641,708, which is a (Continued)

(51) Int. Cl.
*G06F 3/12* (2006.01)
*H04N 1/00* (2006.01)

(52) U.S. Cl.
CPC ....... *H04N 1/00209* (2013.01); *G06F 3/1296* (2013.01); *H04N 1/00206* (2013.01);
(Continued)

(58) Field of Classification Search
None
See application file for complete search history.

(56) References Cited

U.S. PATENT DOCUMENTS

| 4,187,520 A | 2/1980 | Beuchaud |
|---|---|---|
| 4,764,951 A | 8/1988 | Kotani et al. |

(Continued)

FOREIGN PATENT DOCUMENTS

| JP | 2002-009976 | 1/2002 |
|---|---|---|
| JP | 2003-319128 | 11/2003 |

(Continued)

OTHER PUBLICATIONS

International Search Report for WO 2010/030601 A3, dated Mar. 18, 2010, 3 pages.

(Continued)

*Primary Examiner* — Henok A Shiferaw
(74) *Attorney, Agent, or Firm* — Sprinkle IP Law Group

(57) ABSTRACT

A system, method, and apparatus for a virtual fax machine are provided. In one embodiment, a system for a virtual fax machine is provided including a computer configured to display a virtual fax machine based on a script, a server configured to receive at least one electronic document associated with a fax to be sent using the virtual fax machine, and a traditional facsimile machine configured to receive the fax to be sent. In another embodiment, an apparatus for a virtual fax machine is provided including a computer configured to locate and execute a script associated with a virtual fax machine, display the virtual fax machine, associate at least one electronic document with a fax to be sent, encode the at least one electronic document to a form suitable for communication over a network, and transmit the encoded electronic document over the network as the fax to be sent.

20 Claims, 14 Drawing Sheets

Related U.S. Application Data continuation of application No. 14/663,745, filed on Mar. 20, 2015, now Pat. No. 9,143,631, which is a continuation of application No. 13/135,319, filed on Jun. 30, 2011, now Pat. No. 9,007,604.

(60) Provisional application No. 61/360,330, filed on Jun. 30, 2010.

(52) U.S. Cl.
CPC ..... *H04N 1/00212* (2013.01); *H04N 1/00244* (2013.01); *H04N 1/00392* (2013.01); *H04N 1/00464* (2013.01); *H04N 1/00482* (2013.01); *H04N 2201/001* (2013.01); *H04N 2201/0067* (2013.01); *H04N 2201/0093* (2013.01); *H04N 2201/0094* (2013.01)

(56) References Cited

U.S. PATENT DOCUMENTS

| | | |
|---|---|---|
| 5,222,211 A | 6/1993 | Mueller |
| 5,291,302 A | 3/1994 | Gordon |
| 5,367,619 A | 11/1994 | DiPaolo |
| 5,375,176 A | 12/1994 | Spitz |
| 5,386,298 A | 1/1995 | Bronnenberg |
| 5,434,775 A | 7/1995 | Sims et al. |
| 5,563,998 A | 10/1996 | Yaksich |
| 5,664,185 A | 9/1997 | Landfield et al. |
| 5,675,507 A | 10/1997 | Bobo, II |
| 5,991,469 A | 11/1999 | Johnson |
| 6,020,980 A | 2/2000 | Freeman |
| 6,301,339 B1 | 10/2001 | Staples et al. |
| 6,356,356 B1 | 3/2002 | Miller et al. |
| 6,972,858 B1 | 12/2005 | Nishida et al. |
| 6,981,023 B1 | 12/2005 | Hamilton |
| 6,985,494 B2 | 1/2006 | Thompson |
| 7,509,648 B1 | 3/2009 | Afshar et al. |
| 7,613,280 B1 | 11/2009 | Lunde et al. |
| 7,620,177 B2 | 11/2009 | Ibrahim et al. |
| 7,904,811 B2 | 3/2011 | Saito |
| 9,007,604 B2 | 4/2015 | Toscano et al. |
| 9,143,631 B2 | 9/2015 | Toscano et al. |
| 9,641,708 B2 | 5/2017 | Toscano |
| 2002/0054367 A1 | 5/2002 | Tsuchiya |
| 2002/0099456 A1 | 7/2002 | McLean |
| 2002/0133516 A1 | 9/2002 | Davis et al. |
| 2002/0165822 A1 | 11/2002 | Makipaa |
| 2003/0035141 A1 | 2/2003 | Ilda |
| 2003/0093322 A1 | 5/2003 | Sciuk |
| 2003/0112472 A1 | 6/2003 | Eguichi et al. |
| 2003/0187939 A1 | 10/2003 | O'Brien |
| 2003/0233414 A1 | 12/2003 | Henry |
| 2003/0233467 A1 | 12/2003 | Ogasawara |
| 2004/0150157 A1 | 8/2004 | Meade |
| 2004/0186895 A1 | 9/2004 | Elllis |
| 2005/0134903 A1 | 1/2005 | Tanimoto |
| 2005/0141485 A1 | 6/2005 | Miyajima et al. |
| 2005/0179961 A1 | 8/2005 | Czyszczewski et al. |
| 2005/0188226 A1 | 8/2005 | Kasatani |
| 2006/0026597 A1 | 2/2006 | Sakou |
| 2006/0044598 A1 | 3/2006 | Etelapera |
| 2006/0277141 A1 | 12/2006 | Palmer |
| 2006/0291453 A1 | 12/2006 | Kuwahara |
| 2007/0011362 A1 | 1/2007 | Umekage et al. |
| 2007/0106904 A1 | 5/2007 | Christoff et al. |
| 2007/0115512 A1 | 5/2007 | Noel et al. |
| 2007/0198560 A1 | 8/2007 | Foygel et al. |
| 2007/0247611 A1 | 10/2007 | Takahashi et al. |
| 2007/0247661 A1 | 10/2007 | Minami et al. |
| 2007/0255628 A1 | 11/2007 | Takahashi et al. |
| 2008/0089327 A1 | 4/2008 | Lu et al. |
| 2008/0183754 A1 | 7/2008 | Kitada |
| 2008/0263071 A1 | 10/2008 | Ferlitsch et al. |
| 2009/0025078 A1 | 1/2009 | Kuehr-McLaren |
| 2009/0067414 A1 | 3/2009 | Toscano et al. |
| 2009/0164881 A1 | 6/2009 | Segarra et al. |
| 2009/0210383 A1 | 8/2009 | Seemann |
| 2009/0244638 A1 | 10/2009 | Evevsky |
| 2009/0300380 A1 | 12/2009 | Vojak et al. |
| 2010/0097634 A1* | 4/2010 | Meyers ............ H04N 1/00214 358/1.15 |
| 2010/0208726 A1* | 8/2010 | Oliszewski ........ H04N 1/32704 370/352 |
| 2010/0245929 A1* | 9/2010 | Gopalasamy ...... H04N 1/00209 358/402 |
| 2015/0195418 A1 | 7/2015 | Toscano et al. |
| 2015/0373214 A1 | 12/2015 | Toscano |

FOREIGN PATENT DOCUMENTS

| | | |
|---|---|---|
| JP | 2005-244794 | 9/2005 |
| KR | 20030056621 | 7/2003 |
| KR | 20060112501 | 11/2006 |
| WO | WO 2006089223 A2 | 8/2006 |

OTHER PUBLICATIONS

International Search Report for WO 2009/032872 A3, dated Mar. 18, 2010, 4 pages.

Supplemental European Search Report issued for EP Patent Application No. 09813499.2, dated Jul. 18, 2011, 8 pages.

Utano, Jack, "Use of Facsimile Technology in Document Delivery Systems," Mar. 1992: CENDI-Integrated Computer Systems, Inc., Oak Ridge, TN.

Office Action issued for U.S. Appl. No. 13/135,319, dated May 6, 2013, 36 pages.

Office Action issued for U.S. Appl. No. 13/135,319, dated Sep. 27, 2013, 29 pages.

Office Action issued for U.S. Appl. No. 13/135,319, dated Mar. 5, 2014, 33 pages.

Office Action issued for U.S. Appl. No. 13/135,319, dated Aug. 29, 2014, 26 pages.

Notice of Allowance issued for U.S. Appl. No. 14/663,745, dated May 20, 2015, 6 pages.

Office Action issued for U.S. Appl. No. 14/841,454,, dated Nov. 5, 2015, 24 pages.

Office Action issued for U.S. Appl. No. 14/841,454, dated Jun. 13, 2016, 20 pages.

Notice of Allowance issued for U.S. Appl. No. 14/841,454, dated Dec. 21, 2016, 8 pages.

* cited by examiner

SYSTEM, METHOD, AND APPARATUS FOR AN INTERACTIVE VIRTUAL FAX MACHINE

CROSS-REFERENCE TO RELATED APPLICATIONS

This application is a continuation of and claims a benefit of priority under 35 U.S.C. § 120 to U.S. patent application Ser. No. 14/841,454, filed Aug. 31, 2015, issued as U.S. Pat. No. 9,641,708, entitled "SYSTEM, METHOD AND APPARATUS FOR AN INTERACTIVE VIRTUAL FAX MACHINE," which is a continuation application of, and claims a benefit of priority from U.S. patent application Ser. No. 14/663,745, filed Mar. 20, 2015, issued as U.S. Pat. No. 9,143,631, entitled "SYSTEM, METHOD AND APPARATUS FOR AN INTERACTIVE VIRTUAL FAX MACHINE," which is a continuation application of U.S. patent application Ser. No. 13/135,319, filed Jun. 30, 2011, issued as U.S. Pat. No. 9,007,604, entitled "SYSTEM, METHOD, AND APPARATUS FOR AN INTERACTIVE VIRTUAL FAX MACHINE," which is a conversion of, and claims a benefit of priority from U.S. Provisional Application No. 61/360,330, filed Jun. 30, 2010, entitled "INTERACTIVE FLASH-BASED VIRTUAL FAX MACHINE." The applications listed herein are hereby incorporated by reference in their entireties.

BACKGROUND OF THE INVENTION

The invention is related to the communication of electronic documents among computers and traditional facsimile (fax) machines over a network. While traditional fax machines have been successfully relied upon to transmit electronic documents over the public switched telephone network (PSTN) for some time, a growing number of electronic documents are transmitted over public and private packet-switched data networks using, for example, electronic mail (e-mail) applications. However, because traditional fax machines are still commonly available and widely utilized, a need exists to facilitate communication among traditional fax machines connected to the PSTN and computers and other computing devices connected to public and private packet-switched data networks.

A traditional fax machine scans an image printed on a document and encodes the image by assigning digital codes to pixels of a dot matrix that represents the image. Once a traditional fax machine scans and encodes an image into digital form, electrical signals corresponding to the image can be sent over the PSTN to another traditional fax machine, which decodes the image and prints the image as a hardcopy document.

In a typical office environment equipped with a private packet-switched data network and access to a public packet-switched data network such as the Internet, a server is connected to the PSTN by one or more dedicated lines, such as fiber optic or copper T1/E1 lines. From the perspective of the server, the PSTN is both a source of incoming faxes as well as a destination of outgoing faxes. The server is also connected to the private packet-switched data network and, typically, the Internet. Further, the server may recognize computers and other computing devices connected to the private and public packet-switched data networks as both a source of incoming faxes as well as a destination of outgoing faxes.

"Online" fax services are available which make use of e-mail to communicate between a user with an e-mail account and a traditional fax machine. Because e-mail provides a means to send electronic documents of various formats between users by way of an "attachment" of the electronic documents, online fax services receive e-mail attachments, encode the attachments to a form suitable for use by a traditional fax machine, and transmit the encoded attachments to a traditional fax machine over the PSTN.

Existing online fax services rely upon a "server-side" configuration, which requires that a service provider's server execute a majority of the processes associated with the service. Also, existing online fax services are not intuitive to a user because the process of the service bears no resemblance to the steps taken to transmit documents between traditional fax machines.

FIG. 1 illustrates a diagram of a typical "fax over e-mail" system 100. System 100 includes a computer 110, a packet-switched data network 120, a server 130, a PSTN 150, and a traditional fax machine 160. The computer 110 is coupled to the packet-switched data network 120 to facilitate data communication between the computer 110 and the server 130. The server 130 is a computer configured to host websites, host e-mail services, and host facsimile services. Optionally, a server 140 may be required to perform at least some functions of the services hosted by the server 130, if the server 130 is unable to adequately perform the processing requirements of the functions due to high processing demands, processing limitations, and cost constraints.

In operation of the system 100, a user of the computer 110 attaches an electronic document to an e-mail and sends the e-mail to an intended recipient, such as the traditional fax machine 160, using the e-mail services hosted by the server 130. To that end, the e-mail and electronic document attached to the e-mail are transmitted from the computer 110 to the server 130, where the e-mail and electronic document are received by the e-mail service of the server 130. The e-mail service may separate the electronic document from the e-mail and provide the electronic document to the facsimile services of the server 130, along with a specific address (i.e., a PSTN telephone number) for delivery of the electronic document to a traditional fax machine over the PSTN 150. The facsimile services of the server 130 then transmits the electronic document to the traditional fax machine 160 over the PSTN 150, based on the specific address. Finally, the traditional fax machine 160 produces a printed copy of the electronic document received from the server over the PSTN. The fax over e-mail system 100 also receives faxes from the traditional fax machine 160 and transmits the faxes to the computer 110 over the packet-switched data network 120 as an attachment to an e-mail.

It is noted that the fax over e-mail system 100 relies upon a "server-side" configuration. In other words, the server 130 (and possibly the server 140) performs the majority of the processes required for the fax over e-mail system 100. Thus, the server 130 is required in every fax over e-mail system and must have the requisite processing horsepower to efficiently and adequately provide the services associated with the fax over email system 100.

FIG. 2 illustrates an alternative to the fax over e-mail system 100. FIG. 2 illustrates a diagram of a typical "fax over internet" system 200. System 200 includes a computer 210, a packet-switched data network 220, a server 230, a PSTN 250, and a traditional fax machine 260. The computer 210 is coupled to the data network 220 to facilitate data communication between the computer 210 and the server 230. The server 230 is a computer configured to host websites, host e-mail services, and host facsimile services. Optionally, a server 240 may be required to perform at least some functions of the services hosted by the server 230, if the server 230 is unable to adequately perform the processing requirements of the functions due to high processing demands, processing limitations, and cost constraints.

In operation of the system 200, a user of the computer 210 must navigate to an internet fax service website hosted by the server 230 and upload an electronic document to the server 230. The remainder of the processes executed by the fax service of the server 230 are similar to those described above with regard to the facsimile service of the server 130.

Again, it should be appreciated that the fax over internet system 200, like the fax over e-mail system 100, relies upon a server-side configuration. That is, the computer 210 operates merely as a client of the server 230 and, as such, the server 230 performs the majority of the processes required for the fax over internet system 200, without offloading processes required for the fax over internet system 200 to the computer 210.

Accordingly, new systems, methods, and apparatuses to address the shortcomings of the systems discussed above would be desirable.

BRIEF SUMMARY OF THE INVENTION

The invention is directed to various embodiments of a system, method, and apparatus for a virtual fax machine.

In one embodiment, the invention provides a system for a virtual fax machine including a computer having a network browser configured to browse a packet-switched data network, receive a script associated with a virtual fax machine over the packet-switched data network, and display the virtual fax machine based on the script, a server including a facsimile service configured to receive at least one electronic document associated with a fax to be sent using the virtual fax machine, encode the electronic document to a form suitable for communication over a public switched telephone network (PSTN), and transmit the encoded electronic document over the PSTN as the fax to be sent, and a traditional facsimile machine configured to receive the fax to be sent over the PSTN and produce a hardcopy of the electronic document.

In another embodiment, the invention provides an apparatus for a virtual fax machine including a network browser configured to locate and execute a script associated with a virtual fax machine, display the virtual fax machine based on the script, associate at least one electronic document with a fax to be sent using the virtual fax machine, encode the at least one electronic document to a form suitable for communication over a network, and a network interface configured to transmit the encoded electronic document over the network as the fax to be sent.

In another embodiment, the invention provides an apparatus for a virtual fax machine including a network host service configured to host at least one web page or at least one script associated with a virtual fax machine, a facsimile service configured to receive at least one electronic document associated with a fax to be sent using the virtual fax machine, encode the electronic document to a form suitable for communication over a public switched telephone network (PSTN), and transmit the encoded electronic document over the PSTN as the fax to be sent, and a PSTN interface configured to transmit the encoded electronic document over the PSTN as the fax to be sent.

In another embodiment, the invention provides a method for a virtual fax machine including locating and executing, by a computer, a script associated with a virtual fax machine, displaying the virtual fax machine based on the script, associating at least one electronic document with a fax to be sent using the virtual fax machine, encoding the at least one electronic document to a form suitable for communication over a network, and transmitting the encoded electronic document over the network as the fax to be sent.

In another embodiment, the invention provides a computer readable medium storing computer instructions thereon that, when executed by an arithmetic processor, direct the arithmetic processor to perform a method of a virtual fax machine including locating and executing a script associated with a virtual fax machine, displaying a virtual fax machine based on the script, the virtual fax machine including a send paper tray, a receive paper tray, and a send button, associating an at least one electronic document with a fax to be sent, encoding the at least one electronic document to a form suitable for communication over a network, and transmitting the encoded electronic document over the network as the fax to be sent.

BRIEF DESCRIPTION OF THE DRAWINGS

Aspects, objects, and features of the invention will become apparent from the following detailed description, read in conjunction with and reference to the accompanying drawings, where.

DETAILED DESCRIPTION OF THE INVENTION

Figure 1:
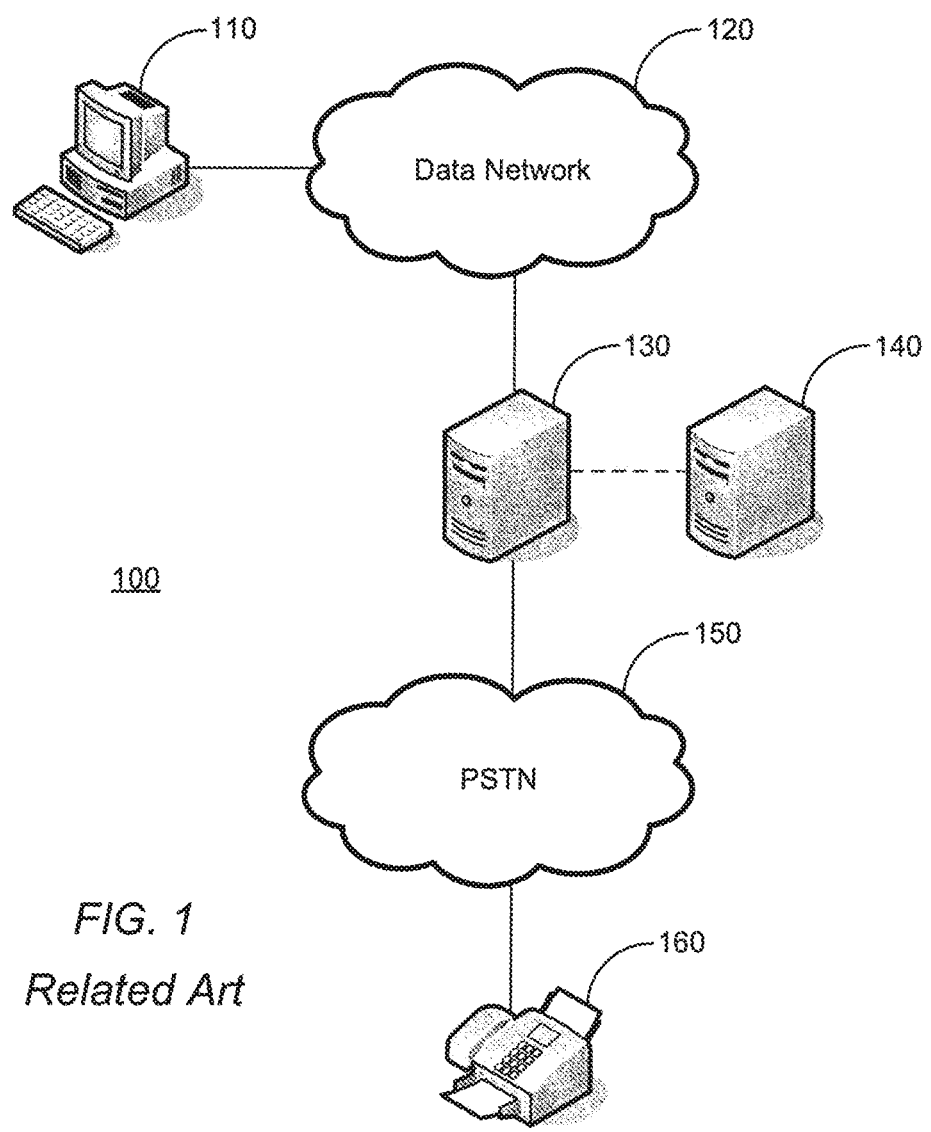
FIG. 1 illustrates elements of a fax over e-mail system.

Various embodiments, aspects, and features of the invention include a system, method, and apparatus for a virtual fax machine using an interactive multimedia tool to facilitate the transmission of electronic documents among a computer or computing device coupled to a packet-switched data network and a traditional fax machine coupled to a PSTN. One embodiment of the invention includes a virtual fax machine implemented at least in part using one of a plurality of available multimedia graphics programming languages, such as Adobe Flash®. Using the interactive visual and audio capabilities of the available multimedia graphics programming languages, the virtual fax machine may simulate actions accompanying the use of a traditional fax machine and provide audible sounds consistent with such use.

Embodiments of the invention include web pages and scripts associated with a virtual fax machine residing on a server coupled to a PSTN and a private, public, or private and public packet-switched data network. In this respect, a user of the virtual fax machine is not required to install any program associated with the virtual fax machine on the user's computer. Instead, the user's computer may be coupled to the packet-switched data network, and a browser application of the user's computer may be configured to access the web pages and scripts associated with the virtual fax machine hosted by the server. Further, the computer, as directed by the web pages and scripts associated with the virtual fax machine, may be further configured to encode electronic documents stored on a memory of the computer to a form suitable for transmission over packet-switched data networks and/or a PSTN, for transmission to the server. The server may be configured to transcode the electronic documents to a form suitable for transmission over a PSTN, if necessary, and transmit the transcoded documents over the PSTN to the traditional facsimile machine. Alternatively, if the electronic documents received by the server from the computer are already encoded to a form suitable for transmission over the PSTN, the server may transmit the electronic documents over the PSTN to the traditional fax machine, without transcoding (i.e., forward the electronic documents over the PSTN). The invention also accommodates the above-described process in reverse by receiving a fax from a traditional fax machine and transcoding the fax to a form suitable for viewing and editing on the user's computer.

Another embodiment of the invention includes web pages, scripts, and/or stand-alone programs associated with a virtual fax machine residing on a computer. As directed by the web pages, scripts, and/or standalone programs, the computer may be configured to encode electronic documents stored on a memory of the computer to a form suitable for transmission over packet-switched data networks and/or a PSTN. Once encoded, the computer may be further configured to transmit the electronic documents to a server for transcoding and transmitting to a traditional fax machine over a PSTN, or forwarding to the traditional fax machine over the PSTN, without transcoding. Alternatively, the computer may be further configured to transmit the encoded electronic documents directly to the traditional fax machine over the PSTN, if equipped with a PSTN interface. The invention also accommodates the above-describe process in reverse by receiving a fax from a traditional fax machine and transcoding the fax to a form suitable for viewing and editing on the user's computer.

Additional aspects of the invention provide a user with visual and audible simulations of a traditional facsimile machine. One aspect of the invention includes providing a degree of aesthetics to visually and audibly aid a user with using a virtual fax machine. For example, when used for a first time, a user of the invention may be more readily capable of using the virtual fax machine of the invention, which provides a graphical representation of a fax machine resembling a traditional facsimile machine (i.e., a virtual fax machine). As a result, the user would intuitively know where to "drag and drop" a file to be faxed or where to "dial" a fax number of a fax recipient. Moreover, the sounds of "dialing," "connecting," or "receiving" may mimic a traditional fax machine such that a user could experience almost immediate familiarity with the virtual fax machine.

Advantageously and in contrast to the operation of the systems 100 and 200, embodiments of the invention may operate based on a client-side scripting configuration. One advantage to a client-side scripting configuration is that memory and processor requirements for functions associated with faxing reside on a user's computer, alleviating the need for a host of a fax service to acquire and maintain servers with large processing and storage capacity.

Turning to the drawings, in which like numerals indicate like elements throughout, embodiments of the invention are described in further detail.

Figure 3:
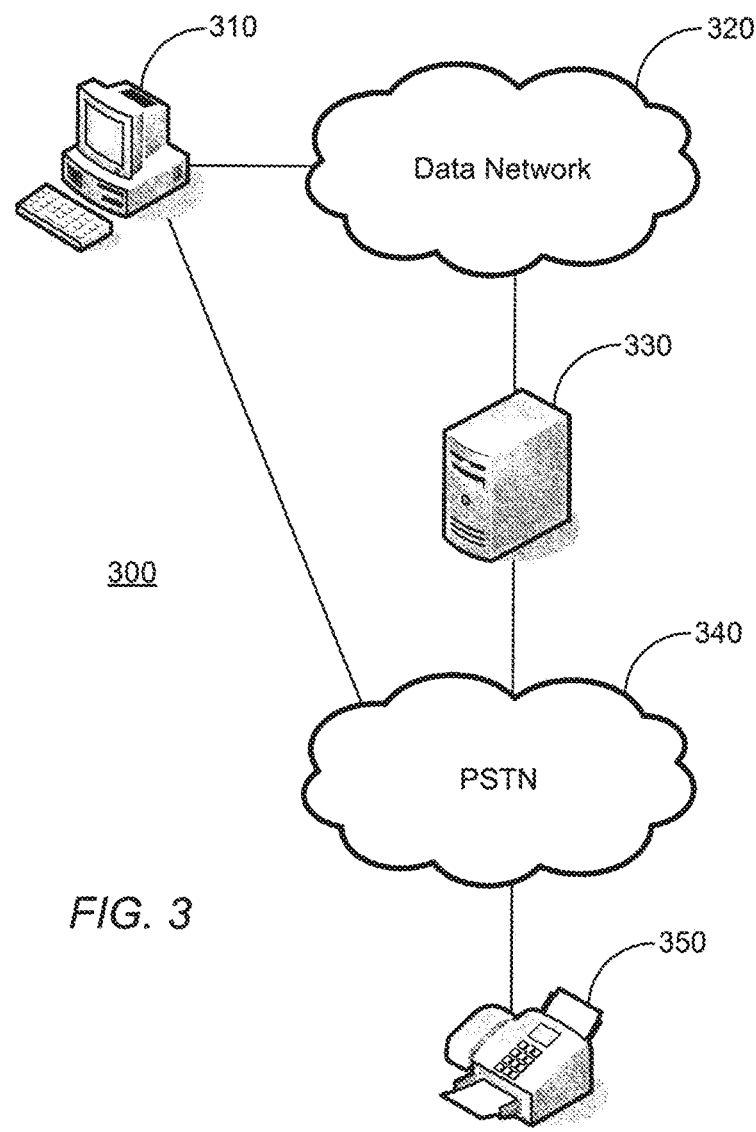
FIG. 3 illustrates a diagram of elements of an embodiment of a system of the invention.

FIG. 3 illustrates an example embodiment of a system 300 including a client-side scripted virtual fax machine. System 300 includes a computer 310, a data network 320, a server 330, a PSTN 340, and a traditional fax machine 350. The computer 310 may comprise a general or special purpose computer. The computer 320 is configured to display a virtual fax machine, attach or associate an electronic document to a fax to be sent, encode the electronic document to a form suitable for transmission over the packet-switched data network 320 and/or the PSTN 340, and transmit the encoded document over the packet-switched data network 320 and/or the PSTN 340. The data network 320 may comprise a public, private, or public and private packet-switched data network, including a Local Area Network (LAN), a Wide Area Network (WAN), and the Internet. The PSTN 340 may comprise a public, private, or public and private switched telephone network. The server 330 may comprise a general or special purpose server. The server 330 is configured to store and host web pages and to perform functions supporting the virtual fax machine. For example, upon request from the computer 310, the server 330 may transmit a copy of a web page, such as a Hypertext Markup Language (HTML) web page, and/or associated scripts to the computer 310 over the packet-switched data network 320. Additionally, the server 330 may be further configured to receive an encoded electronic document from the computer 310 over the packet-switched data network 320, transcode the electronic document to a form suitable for transmission over the PSTN 340, and transmit the encoded electronic document to the traditional fax machine 350 over the PSTN 340. Alternatively, the server 330 may be further configured to receive an electronic document from the computer 310 which is already encoded to a form suitable for transmission to the traditional fax machine 350, and forward the electronic document to the traditional fax machine 350 over the PSTN 340, without transcoding.

According to aspects of the invention, the computer 310 executes a client-side scripted virtual fax machine by interpreting and executing web pages, scripts, and/or programs to display the virtual fax machine and implement functions of the virtual fax machine. In one embodiment, the client-side scripted virtual fax machine is embedded in a web page hosted by the server 330. That is, the client-side scripted virtual fax machine is implemented using one or more scripts embedded in a web page, such as an HTML page, hosted by the server 330. Alternatively, the client-side scripted virtual fax machine may be implemented using one or more stand-alone scripts (i.e., scripts not embedded in a web page) hosted by the server 330. In another embodiment, the client-side scripted fax machine may be implemented either as one or more web pages, scripts, and/or programs stored on a memory of the computer 310. In this embodiment, the server 330 may be unnecessary.

Figure 4:
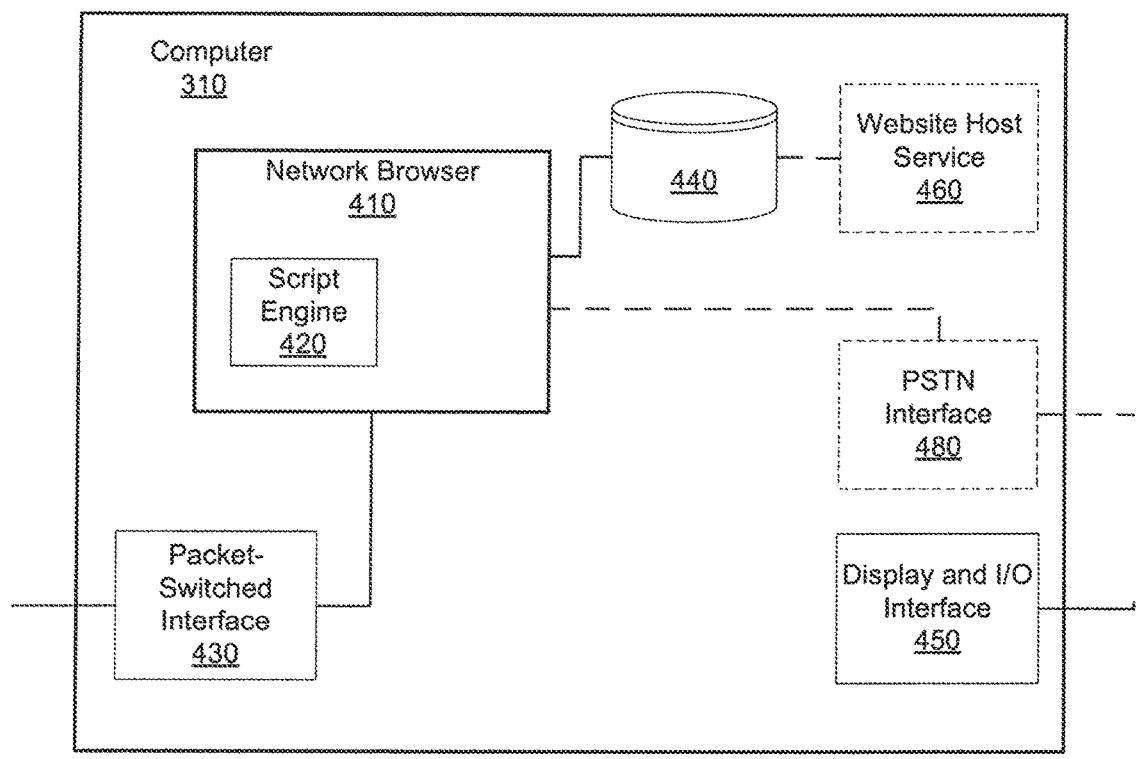
FIG. 4 illustrates a functional block diagram of an embodiment of a computer for implementing aspects of the invention.

With reference to FIG. 4, a functional diagram of the computer 310 is illustrated. In one embodiment, the computer 310 includes a network browser 410 having a script engine 420, a packet-switched interface 430, a memory 440, and a display and input/output (I/O) interface 450. The packet-switched interface 430 is coupled to a packet-switched data network such as the packet-switched data network 320. Thus, the computer 310 is communicatively coupled to the server 330. The network browser 410 may comprise any well-known internet web browser such as Internet Explorer® or Firefox®. The script engine 420 may be native to the network browser 410 or separately installed as an add-on to the network browser 410, to add additional functions and capabilities to the network browser 410. The display and I/O interface 450 comprises hardware interfaces necessary to connect input and output devices to the computer 310. A non-limiting example set of input and output devices which may be connected to the computer 310 via the display and I/O interface 450 include a keyboard, a pointing device (i.e., a mouse), speakers, and a display device (i.e., a monitor). The memory 440 stores data maintained by the computer 440 such as electronic documents viewed and edited by a user of the computer 310.

The network browser 410 is configured to interpret, execute, and display web pages received from a network host service of the server 330 over the packet-switched data network 320 via the packet-switched interface 430. Further, the script engine 420 of the network browser 410 is configured to interpret, execute, and display scripts embedded in web pages received from the server 330, as well as stand-alone scripts received from the server 330. That is, when the script engine 420 of the network browser 410 interprets and executes scripts provided by the server 330 that are associated with the virtual fax machine, the script engine displays a functional version of the virtual fax machine on a display of the computer 310. Additionally, the script engine 420, as directed by web pages and scripts associated with the virtual fax machine, is further configured to attach or associate an electronic document to a fax to be sent, encode the electronic document to a form suitable for transmission over the packet-switched data network 320 (i.e., a web-enabled document), and transmit the encoded electronic document to the server 330 for transcoding and transmitting to the traditional fax machine 350 over the PSTN 340. Alternatively, the script engine, as directed by web pages and scripts associated with the virtual fax machine, may be configured to encode the electronic document directly to a form suitable for transmission over the PSTN 340, and transmit the encoded electronic document to directly to the server 330 for forwarding to the traditional fax machine 350 over the PSTN 340 without transcoding.

In another embodiment, the computer 310 may further include a website host service 460 and a PSTN interface 480. In this embodiment, the network browser 410 and script engine 420 are configured to interpret, execute, and display web pages and scripts received from the website host service 460 executing on the computer 310 itself. The website host service 460 is configured to host web pages and scripts associated with the virtual fax machine stored on the memory 440. Further, the PSTN network interface 480 is configured to communicate directly with devices, such as the traditional fax machine 350, over the PSTN 340. In this embodiment, the script engine may be configured, as directed by web pages and scripts associated with the virtual fax machine, to encode the electronic document directly to a form suitable for transmission over the PSTN 340 to the traditional fax machine 350, and directly transmit the encoded electronic document to the traditional fax machine 350 over the PSTN 340 via the PSTN interface 480.

Figure 5:
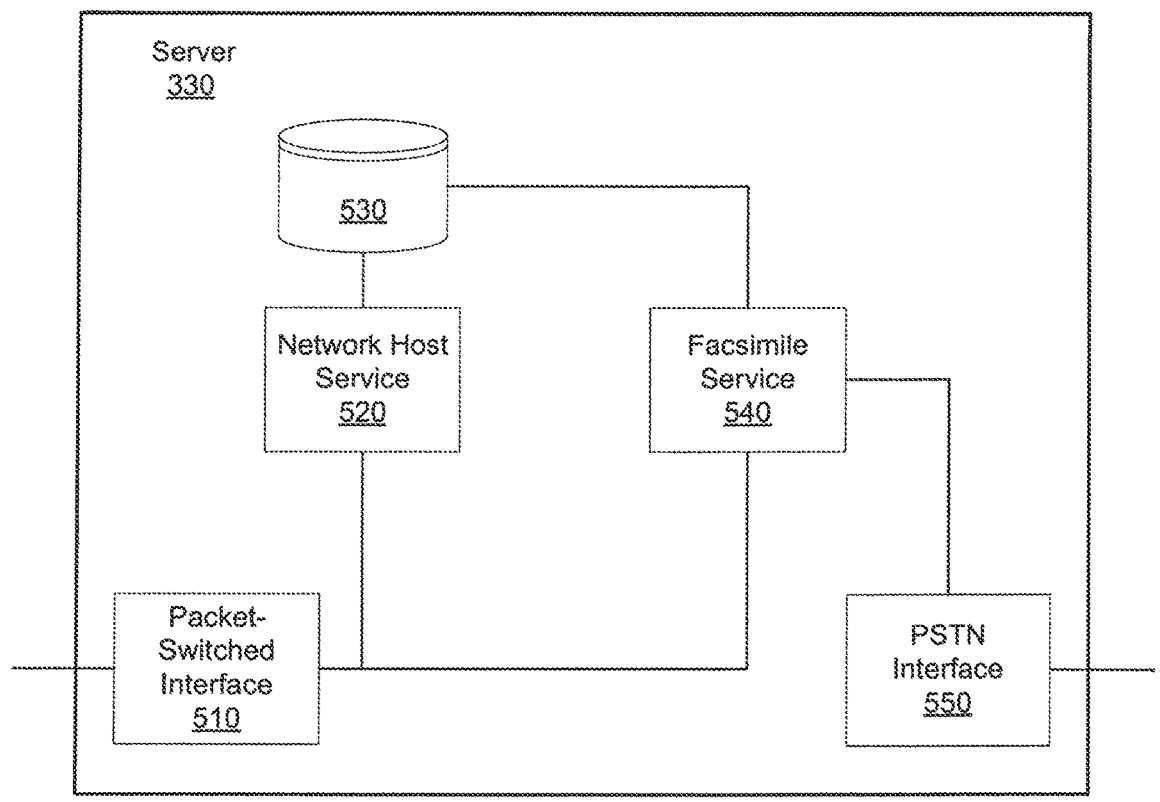
FIG. 5 illustrates a functional block diagram of an embodiment of a server for implementing aspects of the invention.

With reference to FIG. 5, a functional diagram of the server 330 is illustrated. One embodiment of the server 330 includes a packet-switched interface 510, a network host service 520, a memory 530, a facsimile service 540, and a PSTN interface 550. The network host service 520 may comprise a host service configured to host web pages stored on the memory 530 to computers and other computing devices over a packet-switched data network. For example, the network host service 520 is configured to transmit web pages over the packet-switched data network 320 to the computer 310 via the packet-switched interface 510, in response to a request for the web pages from the computer 310. The memory 530 stores data maintained by the server 330, such as web pages and scripts associated with the virtual fax machine. It is noted that the scripts associated with the virtual fax machine may be, at least in part, embedded within the web pages associated with the virtual fax machine.

The facsimile service 540 is configured to receive one or more electronic documents encoded in a form suitable for transmission over packet-switched data networks (i.e., web-enabled documents), transcode the electronic documents to a form suitable for communication over a PSTN, and transmit the transcoded electronic documents over the PSTN, so that the transcoded documents may be received, interpreted, and reproduced by a traditional fax machine. For example, the facsimile service 540 may receive a web-enabled electronic document, transcode (i.e., convert encoding type of) the web-enabled electronic document, and transmit the transcoded electronic document to the traditional fax machine 350 over the PSTN network 340 via the PSTN interface 550, so that the transcoded electronic document may be received, interpreted, and reproduced by the traditional fax machine 350. Transcoding a web-enabled electronic document by the facsimile server 540 includes converting the web-enabled electronic document from a first type of encoding to a second type of encoding, the first type of encoding being suitable for communication over packet-switched data networks and the second type of encoding being suitable for communication over PSTN networks. It is noted that transcoding may be necessary because traditional fax machines are not able to directly interpret coding formats generally utilized by the computer 310, the server 330, and data transmitted over the packet-switched data network 320. In other words, the facsimile service 540 is configured to transcode web-enabled content received from the computer 310 into PSTN-enabled content which is suitable to be communicated over the PSTN and which is also capable of being interpreted by traditional fax machines. In another embodiment, the facsimile service 540 may receive an electronic document already encoded in a form suitable for transmission over a PSTN, and directly transmit (i.e., forward) the encoded document over the PSTN network 340 via the PSTN interface 550, without transcoding.

It is noted that the above-described process may also operate in reverse to receive a fax from a traditional fax machine. That is, the traditional fax machine 350 scans a hardcopy (i.e., paper copy) of a document to capture an image on the document, produces an electronic copy of the image, encodes the image according to an encoding type suitable for transmission over the PSTN 340, and transmits the encoded image to the server 330. At the server 330, upon receipt of the encoded image from the fax machine 350 at the PSTN interface 550, the PSTN interface 550 routes the encoded image to the facsimile service 540. The facsimile service 540 receives the encoded image, transcodes the image to a form suitable transmitting over a packet-switched data network and/or for viewing and editing on a computer, and stores the transcoded image to the memory 530. To that end, computing devices, such as the computer 310, may view and retrieve the transcoded image over the packet-switched data network 320. It is noted that faxes received over the PSTN 340 from traditional fax machines are stored in relation to a virtual fax number which they are received upon, so that they may be made available only to an appropriate destination virtual fax machine. In embodiments of the invention, a virtual fax machine may be associated with a virtual fax number, so that a traditional fax machine may transmit documents to be received by the virtual fax machine. In this case, for example, the PSTN 340 may be configured to route calls placed to a virtual fax machine number to the server 330, as the server 330 supports virtual fax machines.

As a further description of the operation of the system 300, a user of the computer 310 may request a web page or pages and scripts associated with a virtual fax machine from the server 330 over the packet-switched data network 320 using the network browser 410. That is, a user of the computer 310 may direct the network browser 410 to access the web pages and scripts associated with the virtual fax machine that are stored on the server 330 by specifying a location of the web pages and scripts on the server 330 using a Uniform Resource Locator (URL). For example, a URL of specifying web pages and scripts associated with the virtual fax machine on the server 330 may comprise an interne address such as www.fax2mail.com. At the server 330, the request is routed to and received by the network host service 520, which retrieves a copy of the web pages and scripts associated with the virtual fax machine from the memory 530, and transmits the copy of the web pages and scripts to the computer 310 over the packet-switched data network 320 via the packet-switched interface 510. At the computer 310, the web pages are routed to and received by the network browser 410 via the packet-switched interface 430. In turn, the network browser 410 and the script engine 420 interpret, execute, and display the virtual fax machine based on the web pages and scripts. More specifically, the web pages and scripts associated with the virtual fax machine are interpreted, in parts, by the network browser 410 and the script engine 420. For example, HTML portions of the web pages may be interpreted and displayed directly by the network browser 410, while scripted portions of the web pages and the scripts may be interpreted, executed, and displayed by the script engine 420 of the network browser 410.

Figure 2:
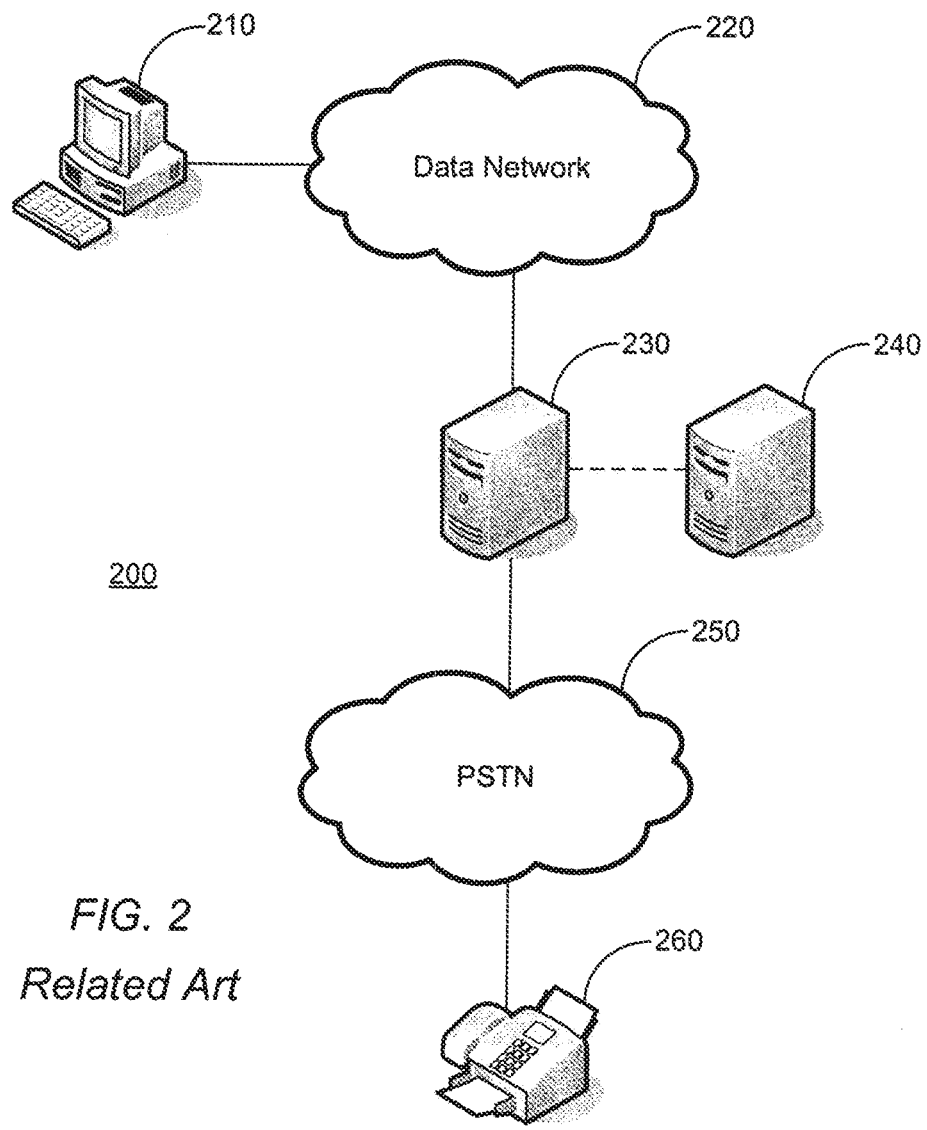
FIG. 2 illustrates elements of a fax over interne system.

Because the script engine 420 resides at the computer 310, the processing requirements to interpret, execute, and display the virtual fax machine and the functions of the virtual fax machine are supported by the computer 310 and not the server 330. In this manner, the virtual fax machine of the invention is client-scripted. In contrast to the server-scripted "fax over email" and "fax over internet" configurations described above with reference to FIGS. 1 and 2, the virtual fax machine of the invention relies upon servers for relatively less amounts of processing. Instead, processing demands are distributed to individual client computers. That is, in comparison to the servers 130 and 230, which are substantially relied upon for the "fax over email" and "fax over internet" systems, the server 330 is not substantially relied upon for the virtual fax machine of the invention. Thus, according to one aspect of the invention, processing demands are distributed to each client computer that requests web pages and scripts associated with the virtual fax machine, such as the computer 310.

In the embodiment of the system 300 in which the computer 310 includes the website host service 460 and the PSTN interface 480, a user of the computer 310 may request web pages and scripts associated with the virtual fax machine from the website host service 460. That is, a user of the computer 310 may direct the network browser 410 to access the web pages and scripts associated with the virtual fax machine that are stored on the computer 310 by specifying a local location on the computer 310 using a Uniform Resource Locator (URL) or a path name on the memory 440. At the computer 310, the web pages are received by the network browser 410, and the network browser 410 and the script engine 420 interpret, execute, and display the web pages and scripts associated with the virtual fax machine on a display of the computer 310.

Additionally, in the embodiment of the system 300 in which the computer 310 includes the website host service 460 and the PSTN interface 480, the script engine 420 may be configured to attach or associate an electronic document to a fax to be sent, encode the document to a form suitable for transmission over the packet-switched data network 320, and transmit the encoded document to the server 330 for transcoding and forwarding over the PSTN 340 via the PSTN interface 550. Alternatively, based on the web pages and scripts associated with the virtual fax machine, the script engine 420 may be configured to attach or associate an electronic document to a fax to be sent, encode the document to a form suitable for transmission over the PSTN 340, and transmit the encoded document to the server 330 for direct forwarding over the PSTN 340 via the PSTN interface 550, without transcoding. Additionally, the script engine 420 may be further configured to attach or associate an electronic document to a fax to be sent, encode the document to a form suitable for transmission over the PSTN 340, and directly transmit the encoded document to the traditional fax machine 350 over the PSTN 340 via the PSTN interface 480. Thus, as will be appreciated, the invention includes embodiments of the system 300 which do not rely upon the server 330, when the computer 310 includes the PSTN interface 480. It is noted that the above-describe process may also operate in reverse to receive a fax from a traditional fax machine. Additionally, the functions and processes of the web pages and scripts associated with the virtual fax machine may be implemented by a stand-alone program stored on the computer 310 which may be executed on the computer 310 without interpretation and execution via the network browser 410 and script engine 420.

In embodiments of the invention, the extent of the functions and processes performed by the network browser 410, the script engine 420, and/or the computer 310 are defined by the web pages, scripts, and/or programs associated with the virtual fax machine. The invention includes embodiments in which the web pages, scripts, and/or programs associated with the virtual fax machine include instructions for visual and audio display of the virtual fax machine, functions attributed to the virtual fax machine, and functions associated with encoding electronic document into forms suitable for transmission over a packet-switched data network and/or a PSTN.

Figure 6:
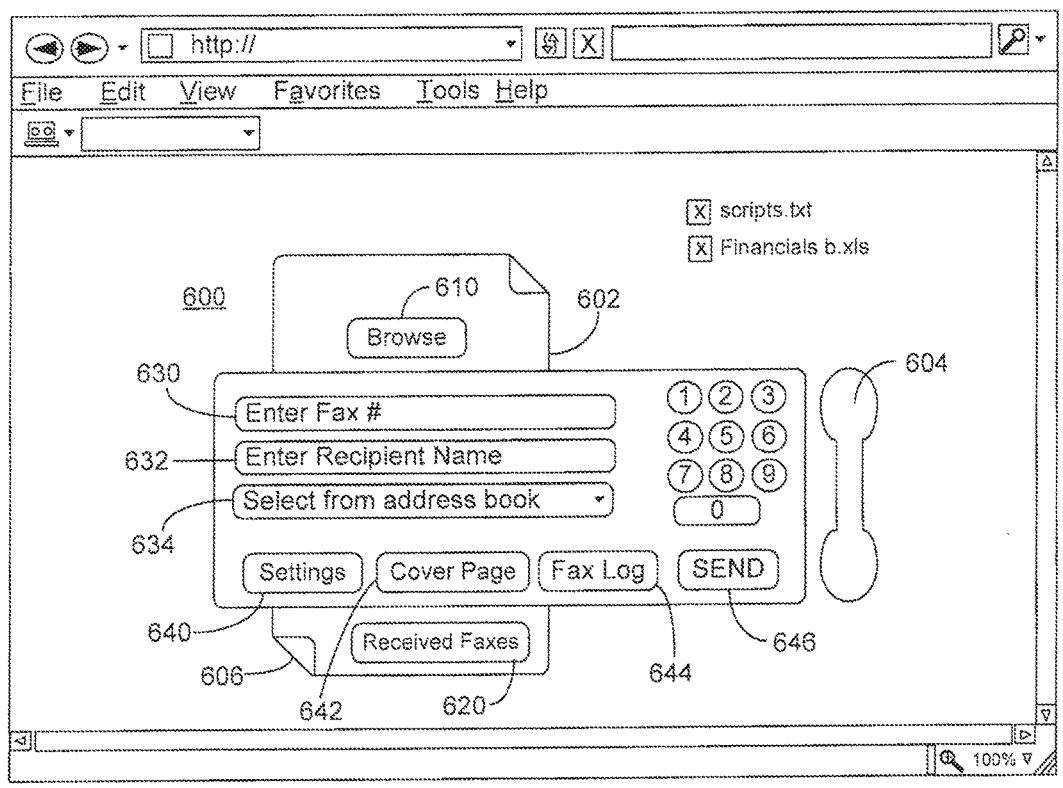
FIG. 6 illustrates an embodiment of a display of a virtual fax machine for implementing aspects of the invention.

FIG. 6 illustrates an example display of a virtual fax machine 600, whether embodied as web pages and scripts stored at the server 330, web pages and scripts stored at the computer 310, and/or as a program stored at the computer 310. The virtual fax machine 600 includes a send paper tray 602 having a browse button 602, a virtual handset 604, and a receive paper tray 606 having a received faxes button 620. As illustrated in FIG. 6, the virtual fax machine 600 further includes the following fields and buttons: an enter fax number field 630, an enter recipient name field 632, a select from address book pulldown menu button 634, a settings button 640, a cover page button 642, a fax log button 644, a send button 646, and a plurality of numerical buttons.

In one embodiment, the virtual fax machine 600 is implemented at least in part using one of a plurality of available multimedia graphics programming languages utilized on the Internet, such as Adobe Flash®. Using the interactive visual and audio capabilities of the available multimedia graphics programming languages, the virtual fax machine may visually simulate actions accompanying the use of a traditional fax machine and provide audible sounds consistent with such use.

As illustrated in FIG. 6, the virtual fax machine 600 resembles a traditional fax machine. In this manner, a user of the virtual fax machine 600 may be readily able to use the virtual fax machine 600 based upon intuition and familiarity with traditional fax machines. Embodiments of the virtual fax machine 600 further include traditional tones and sounds generated by a traditional fax machine, to enhance a user's understanding of the operation of the virtual fax machine 600. The traditional tones and sounds include, for example, dial tones, touch-tones generated with respect to selection of the numerical keys, paper feed and eject sounds, and facsimile connection sounds. The sounds may be generated over a speaker connected to the computer 310. Additional embodiments of the virtual fax machine 600 include flashing icons indicating that a new status message has been received and that at least one new inbound fax has arrived. Further, the virtual fax machine 600 may comprise a dialog box that flashes or otherwise displays additional "Fax Status" or "New Fax" messages when at least one outgoing fax has been completed or at least one new inbound fax has arrived. In this case, the "Fax Status" message does not flash until an outgoing fax has been fully completed.

To attach or associate an electronic document to a fax to be sent, the virtual fax machine 600 enables a user to "drag and drop" one or multiple files to the send paper tray 602. Additionally, a user may select one or multiple files using a browser window by selecting the browse button 610 by an input device of the computer 310. As an example illustrated in FIG. 6, two electronic documents, "scripts.txt" and "Financials b.txt," are attached to be faxed. Similarly, to un-attach an electronic document, an "X," as illustrated in FIG. 6, or an alternative means is provided by the virtual fax machine 600. It is noted that the virtual fax machine 600 is capable of attaching or associating various types of electronic documents such as the suite of Microsoft Office© documents, for example.

The enter fax number field 630 is available for a user to enter a number of a recipient of a fax to be sent. More particularly, the enter fax number field 630 is available for a user to enter a telephone number routed by a PSTN to a traditional fax machine. The enter recipient name field 632 is available for a user to enter a name of the recipient of a fax to be sent. To that end, the name of the recipient entered in the recipient name field 632 may be included in the printed copy of the fax received by a receiving fax machine and/or stored for further use by additional functions of the virtual fax machine 600.

The virtual fax machine 600 may be used to send faxes to multiple recipients separated by delimiters such as semicolons. That is, multiple fax numbers separated by delimiters may be added in the enter fax number field 630, or multiple recipient names separated by delimiters may be added in the enter recipient name field 632. Fax numbers may be entered into the enter fax number field 630 using the numeric keypad of the virtual fax machine 600 or by an input device of the computer 310. Alternatively, a recipient name may be typed in the enter recipient name field 632 or selected from an address book using the address book button 634. Once at least one electronic document is attached and the fields 630 and/or 632 are completed by a user, the transmission of a fax to be sent may be commenced by selection of the send button 646 by an input device of the computer 310.

Figure 7:
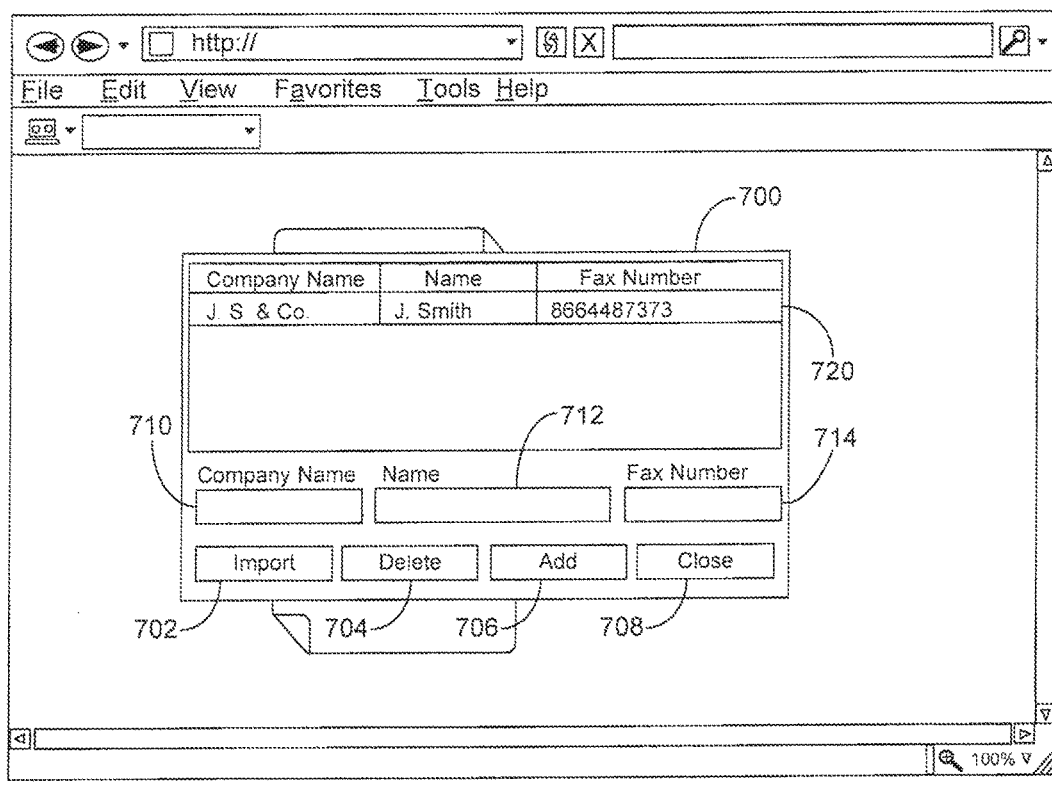
FIG. 7 illustrates an embodiment of an address book dialog box of a virtual fax machine for implementing aspects of the invention.

Turning to FIG. 7, according web pages, scripts, and/or programs associated with the virtual fax machine 600, an address book dialog box 700 opens based on a selection of the address book button 634 using an input device of the computer 310. As an example, the address book dialog box 700 lists entries 720 including company name, name, and fax number fields. The address book dialog box also includes an import button 702, a delete button 704, an add button 706, and a close button 708. The address book dialog box 700 allows a user to manually add and delete contacts and import contacts from a file or a secondary address book related to another application. More specifically, the virtual fax machine 600 is able to import contacts from a file, such as a *.CSV file, or from an application, such as Microsoft Outlook®. Alternatively, a user may manually enter a new contact into a company name field 710, a name field 712, and a fax number field 714, using the input device of the computer 310. After the fields 710, 712, and 714 are completed, the user may select the add button 706 to add the contact to the address book 700. Contacts may also be deleted by selecting one or more entries 720 and selecting the delete button 704 by an input device of the computer 310. Selection of the close button 708 will close the address book dialog box 700. It is noted that one or more specific entries in the address book dialog box 700, such as entry 720, may be double-clicked using the input device of the computer 310, to close the address book dialog box 700 and automatically populate the recipient number field 630 and/or the recipient name field 632 with the information associated with the entries of the address book. Additionally, the entries of the address book may be sorted by company name, name, or fax number by selecting a header of an entry of the address book. It is also noted that various embodiments of the address book dialog box 700 include additional fields in each entry 720, such as separate first and last name fields, user-defined reference and note fields, and a frequently faxed checkbox.

Figure 8:
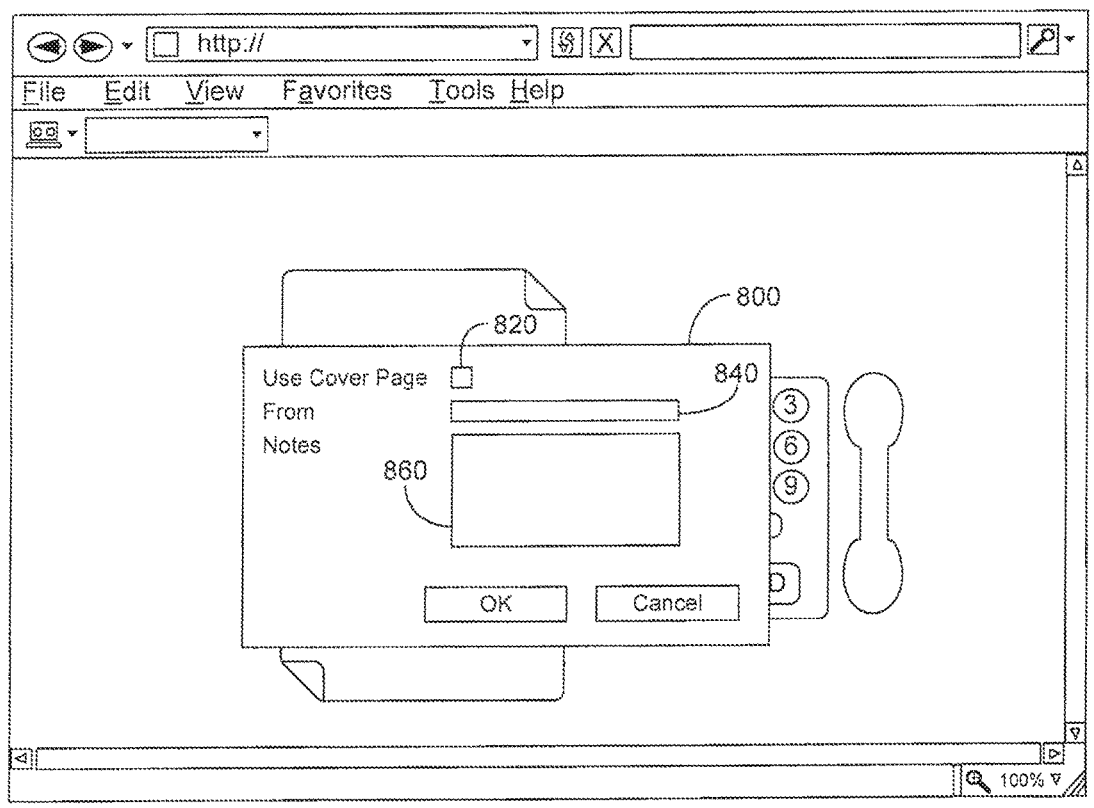
FIG. 8 illustrates an embodiment of a cover page dialog box of a virtual fax machine for implementing aspects of the invention.

FIG. 8 illustrates an example of a cover page dialog box 800 according to web pages, scripts, and/or programs associated with the virtual fax machine 600. The cover page dialog box 800 opens based on a selection of the cover page button 642 of the virtual fax machine 600. Using the cover page dialog box 800, a user can select to use (i.e., add) a cover page by selecting box 820 by an input device of the computer 310. Additionally, a user can add text to the cover sheet using the "From" field 840 and the "Notes" field 860. Text added to the fields 840 and 860 may be added to a cover page attached at the beginning of a fax to be sent by the virtual fax machine 600. Embodiments of the invention may also include additional fields of text to be added to the cover page, such as a subject field or other fields useful for identifying, distinguishing, and describing an incoming facsimile. After making appropriate selections, the cover page dialog box 800 may be closed by selecting the "OK" button.

Alternatively, the cover page dialog box 800 may be closed without saving any selections by selecting the "Cancel" button.

Figure 9:
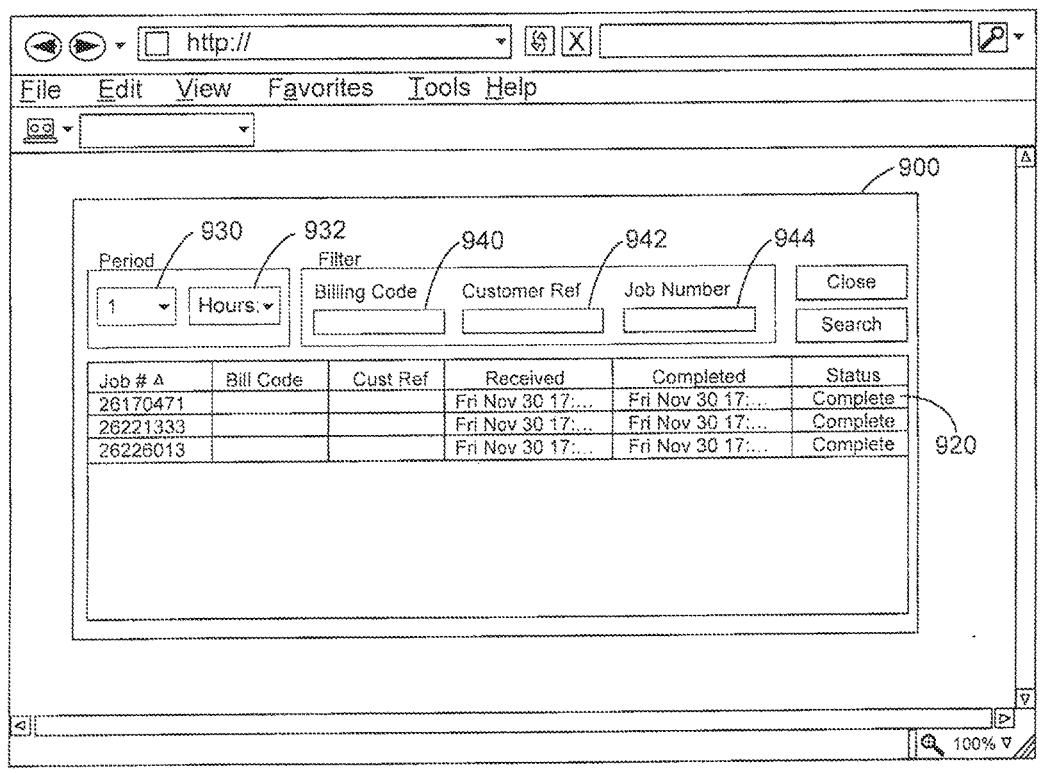
FIG. 9 illustrates an embodiment of a fax log dialog box of a virtual fax machine for implementing aspects of the invention.

FIG. 9 illustrates an example of a fax log dialog box 900 according to web pages, scripts, and/or programs associated with the virtual fax machine 600. The fax log dialog box 900 opens based on a selection of the fax log button 644 of the virtual fax machine 600. Using the fax log dialog box 900, a user can search among a log of faxes sent using the virtual fax machine 600 over a period of time. The fax dialog box 900 includes magnitude 930 and unit 932 time period pulldown menu fields, billing code 940, customer reference 942, and job number 944 filter fields, and fax log entries 920. A period of time for a fax log search may be set according to the pulldown menu fields 930 and 932. After the period of time is selected, a search of sent faxes may be performed by selecting the "Search" button by an input device of the computer 310. The search may return one or more fax log entries 920. Additionally, a user can perform a filtered search of sent faxes using the virtual fax machine 600, according to the billing code filed 940, the customer reference field 942, and the job number field 944. Among the fax log entries 920, sent faxes may also be sorted according to any of the column headings, such job number, bill code, customer reference, received, completed, and status. A fax may be re-sent or viewed by double-clicking an entry 920 in the fax log by an input device of the computer 310. Embodiments of the invention may also include additional filter fields, sent fax entry fields, and column headings. For example, in alternative embodiments of the fax log dialog box, each fax log entry 920 may include a page count field and a fax number field which displays a telephone number of a sent fax. The fax log dialog box 900 may be closed by selecting the "Close" button.

Figure 10:
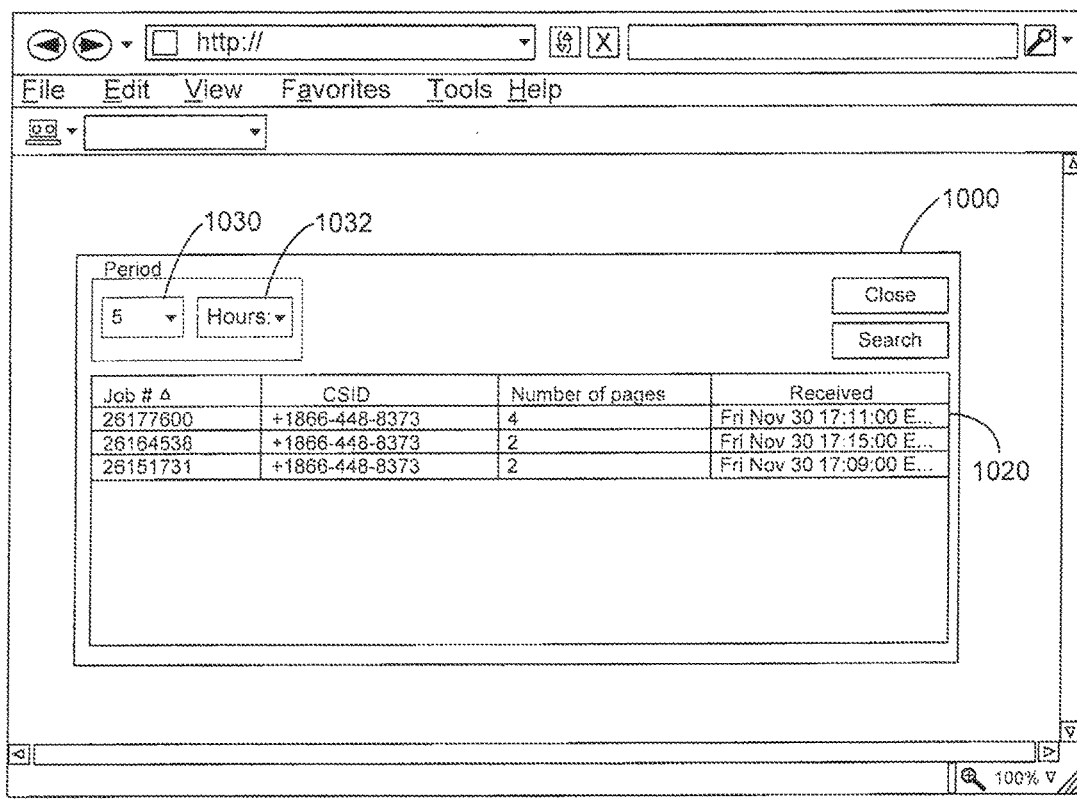
FIG. 10 illustrates an embodiment of a received fax dialog box of a virtual fax machine for implementing aspects of the invention.

FIG. 10 illustrates an example of a received fax dialog box 1000 according to web pages, scripts, and/or programs associated with the virtual fax machine 600. The received fax dialog box 1000 opens based on a selection of the received faxes button 620 of the virtual fax machine 600. Using the received fax dialog box 1000, a user can search among a log of faxes received by the virtual fax machine 600 over a period of time. The period of time for a search can be set according to the numerical pulldown menu 1030 and the unit pulldown menu 1032. After the period of time has been selected, a search of received faxes may be performed by selecting the "Search" button by an input device of the computer 310. The search may return one or more received fax entries 1020. Using the input device of the computer 310, one or more received fax entries 1020 may be selected for copying or viewing from the server 330. In additional embodiments of the invention, a user can perform a filtered search of faxes received by the virtual fax machine 600 according to various filter fields, such as billing code, customer reference, job number, and telephone number. Among the entries 1020, received faxes may also be sorted according to any of the column headings, such job number, CSID (i.e., telephone number), number of pages, and received time. Embodiments of the invention may also include additional received fax entry fields and column headings of the received fax entries 1020. The fax log dialog box 1000 may be closed by selecting the "Close" button.

Figure 11:
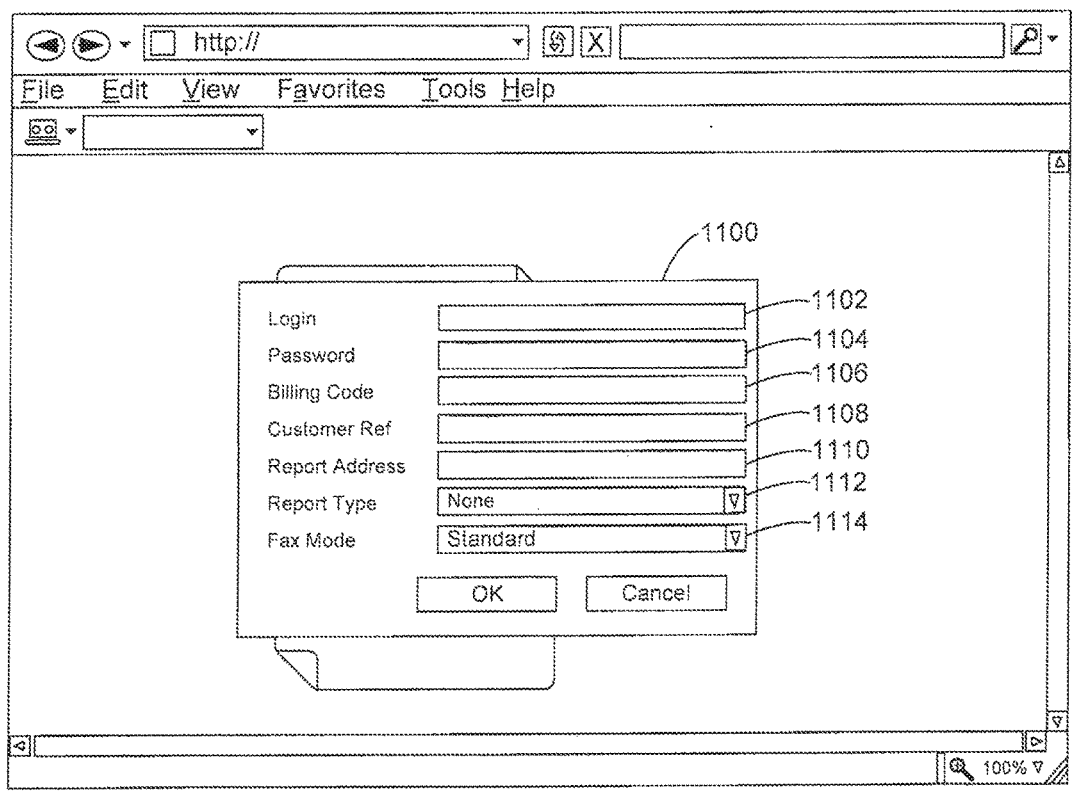
FIG. 11 illustrates an embodiment of a settings dialog box of a virtual fax machine for implementing aspects of the invention.

FIG. 11 illustrates an example of a settings dialog box 1100 according to web pages, scripts, and/or programs associated with the virtual fax machine 600. The settings dialog box 1100 opens based on a selection of the settings button 640 of the virtual fax machine 600. The settings dialog box 1100 may be presented to a new user before the new user uses the virtual fax machine 600 for the first time. In the settings dialog box 1100, the new user is prompted to enter a login (i.e., username) at field 1102 and password at field 1104. Optionally, a user may also enter text in a billing code field 1106 and a customer reference field 1108. The report address field 1110 is available to specify an alternate delivery address for fax reports. As an additional option, report type and fax mode pull-down menus 1112 and 1114, respectively, are available to select an appropriate detail level of reports and image quality of faxes. The information entered by user at the settings dialog box 1100 may be stored at the computer 310, the server 330, or both the computer 310 and the server 330 for future use in aspects of the virtual fax machine 600.

Figure 12:
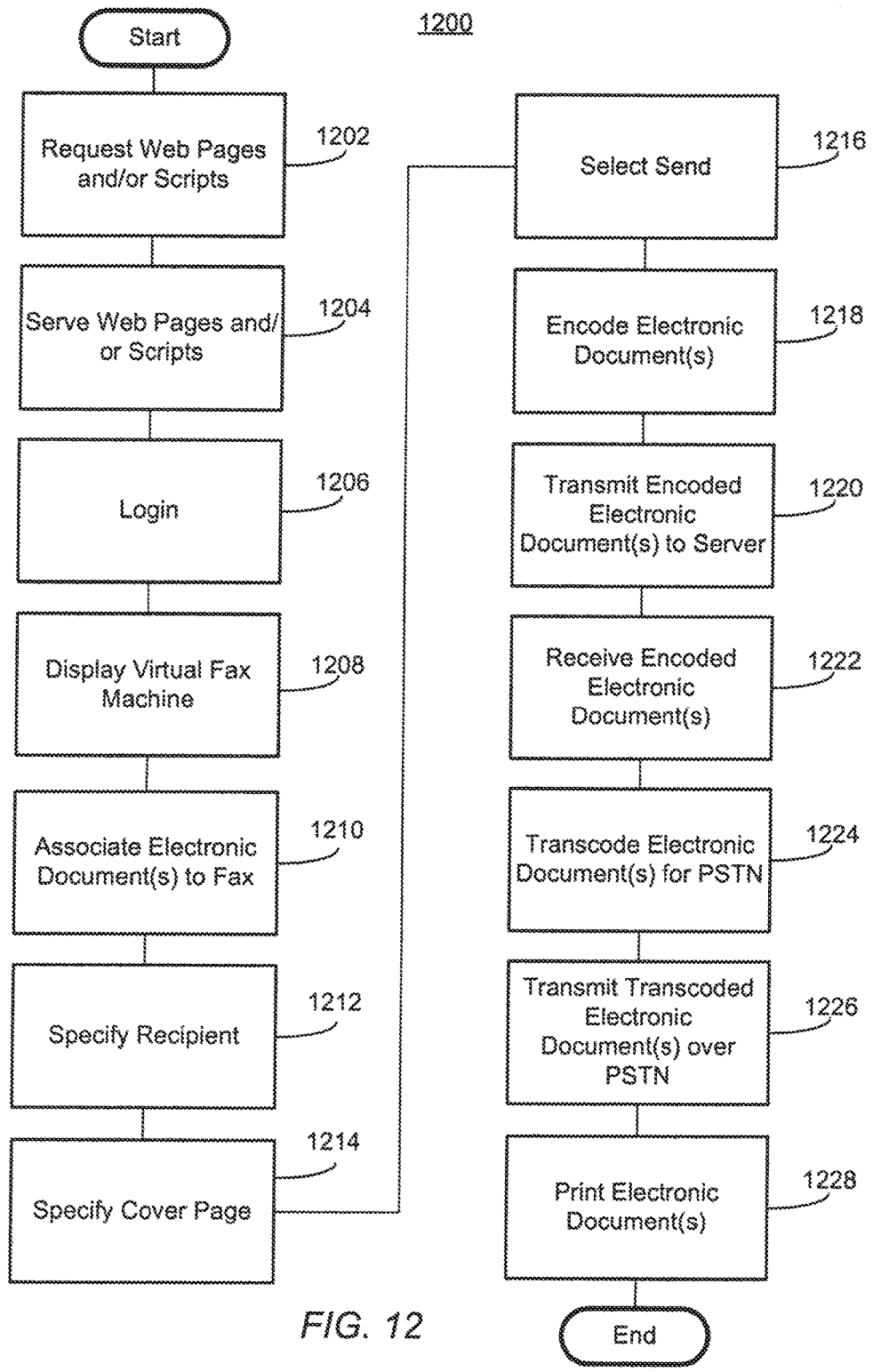
FIG. 12 illustrates a method of sending faxes according to an embodiment of the invention.

FIG. 12 illustrates an example embodiment of a method of sending faxes 1200 using the virtual fax machine 600 according to web pages, scripts, and/or programs associated with the virtual fax machine. Beginning at step 1202, a user of the computer 310 may direct the network browser 410 to request web pages and scripts associated with the virtual fax machine 600 from the server 330. At step 1204, the server 330 receives the request from the computer 310 and sends one or more web pages and scripts associated with the virtual fax machine 600 to the computer 310 via the packet-switched data network 320, in response to the request. It is noted that the request for the web pages and scripts associated with the virtual fax machine 600 may occur as a plurality of requests. For example, individual files (i.e., individual web pages and scripts) associated with the virtual fax machine 600 may be requested at respective points in time, and the server 330 may receive the individual requests and send individual files in turn. It is further noted that the scripts may also be embedded, at least in part, within the web pages associated with the virtual fax machine 600, as discussed above.

Based on the web pages and scripts sent by the server 330, the network browser 410 of the computer 310 displays the settings screen 1100 on a display of the computer 310 at step 1206. Alternatively, if the user is an established user of the virtual fax machine 600, step 1206 may be skipped in favor of step 1208. That is, some embodiments of the method 1200 display the settings dialog box only for a new user.

At step 1208, the virtual fax machine 600 is displayed on the display of the computer 310. That is, at step 1208, the network browser 410 and script engine 420 of the computer 310 may interpret and execute the web pages and scripts received from the server 330, to display the virtual fax machine 600 illustrated in FIG. 6. Using the virtual fax machine 600, a user may attach or associate one or more electronic documents stored on the memory 440 of the computer 310 to a fax to be sent, at step 1210, and specify a recipient of the fax to be sent, at step 1212. That is, according to the web pages, scripts, and/or programs associated with the virtual fax machine, a user may attach or associate one or more electronic documents by "drag and drop" to the send paper tray 602 or by selecting the browse button 610 at step 1210. Additionally, a user may specify one or more fax numbers of the fax to be sent, at the fax number field 630, specify a name of one or more recipients of the fax to be sent, at the recipient name field 632, and/or specify one or more recipients of the fax to be sent using the address book dialog box 700, at step 1212. A cover page may also be selected and text associated with the cover page specified using the cover page dialog box 800 at step 1214. After one or more electronic documents have been attached or associated with the fax to be sent and at least one recipient of the fax to be sent has been specified at steps 1210, 1212, and 1214, the user may commence the transmission of the fax to be sent at step 1216 by selecting the "Send" button 646 of the virtual fax machine 600 by an input device of the computer 310.

According to the web pages, scripts, and/or programs associated with the virtual fax machine 600, any attached or associated electronic documents are processed for transmission to the server 330 by the computer 310 at step 1218. That is, any attached or associated electronic documents are encoded to a form suitable for transmission over a packet-switched data network (i.e., as web-enable documents), for transmission to the server 330 over the packet-switched data network 320, at step 1218. Alternatively, any attached or associated electronic documents may be encoded to a form suitable for transmission over a PSTN, for transmission to the server 330 over the packet-switched data network 320, at step 1218. The encoded documents are transmitted by the computer 310 to the server 330 over the packet-switched data network 320, along with any cover page information and information specific to the one or more recipients of the fax to be sent, at step 1220.

At step 1222, the server 330 receives the encoded electronic documents from the computer 310 over the packet-switched data network 320 via the packet-switched interface 510 and routes the encoded electronic documents to the facsimile service 540. At step 1224, the facsimile service 540 transcodes the electronic documents to a form suitable for transmission over a PSTN to a traditional fax machine. For example, as discussed above, the facsimile service 540 transcodes the electronic documents from a first type of encoding suitable for communication over the packet switched data network 320 to a second type of encoding suitable for communication over the PSTN network 340. Alternatively, if the electronic documents are received by the server 300 from the computer 310 in a form suitable for transmission over the PSTN network 340, step 1224 may be skipped.

At step 1226, the facsimile service 540 transmits the transcoded electronic documents to a traditional fax machine over the PSTN network 340 via the PSTN interface 550. For example, based upon the one or more fax numbers specified by the user at step 1212, the facsimile service 540 may transmit the transcoded electronic documents to the traditional fax machine 350 over the PSTN network 340, and the traditional fax machine 350 may receive, interpret, and reproduce the transcoded electronic documents in hardcopy form at step 1228. Alternatively, if the electronic documents are received by the server 300 from the computer 310 in a form suitable for transmission over the PSTN network 340, the facsimile service 540 may directly transmit the electronic documents to the traditional fax machine 350 over the PSTN network 340 via the PSTN interface 550.

Figure 13:
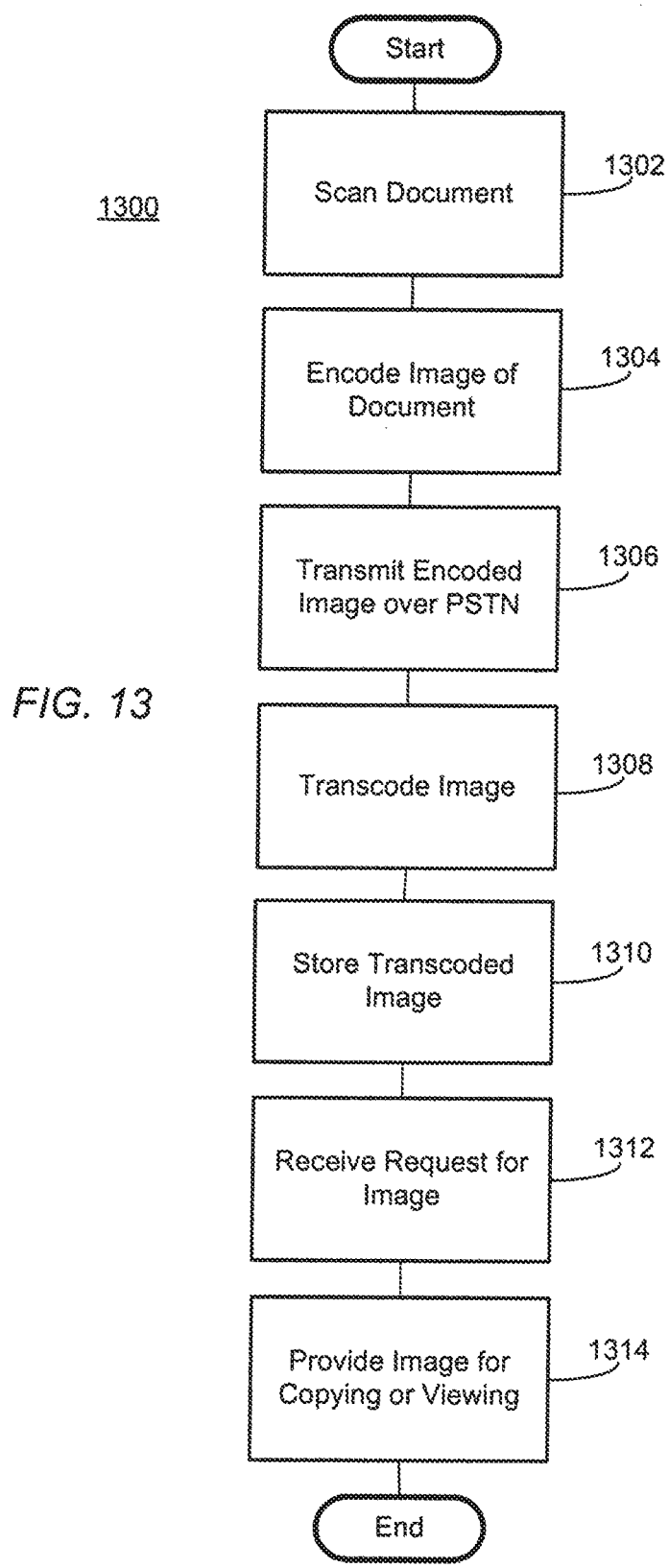
FIG. 13 illustrates a method of receiving faxes according to an embodiment of the invention.

FIG. 13 illustrates an example embodiment of a method of receiving faxes 1300 using the virtual fax machine 600. Beginning at step 1302, a user of the traditional fax machine 350 scans a hardcopy of a document to capture an image on the document and produce an electronic copy of the image. At step 1304, the traditional fax machine 350 encodes the electronic copy of the image according to a form suitable for transmission over the PSTN 340, to produce an encoded image. At step 1306, the traditional fax machine 350 transmits the encoded image to the server 330 over the PSTN 340, using a number associated with the virtual fax machine. At the server 330, upon receipt of the encoded image at the facsimile service 540 via the PSTN interface 550, the facsimile service 540 transcodes the image data to a form suitable for viewing and editing on the a computer, at step 1308, and stores the encoded image data to the memory 530, at step 1310.

Subsequently, a user of the computer 310 requests web pages associated with the virtual fax machine 600 from the server 330 over the packet-switched data network 320 using the network browser 410. Further, based upon a user's selection of one or more received fax entries 1020 for copying or viewing, the computer 310 transmits and the server 330 receives, at step 1312, a request for image data associated with the one or more received fax entries 1020. In response to the request, the server 330 retrieves the image data from the memory 530 and provides a copy of the image data to the computer 310 for copying or viewing at step 1314. Variations of steps 1310 and 1312 include posting the image data as part of web page, specifying a link to the image data on a web site hosted by the server, or sending an e-mail including an attachment of the image data.

In embodiments of the invention in which the computer 310 includes the website host service 460 and the PSTN interface 480, the computer 310 may perform methods similar to methods 1200 and 1300 described above, except that all steps may be performed among the computer 310, the traditional fax machine 350, and the PSTN 340.

Figure 14:
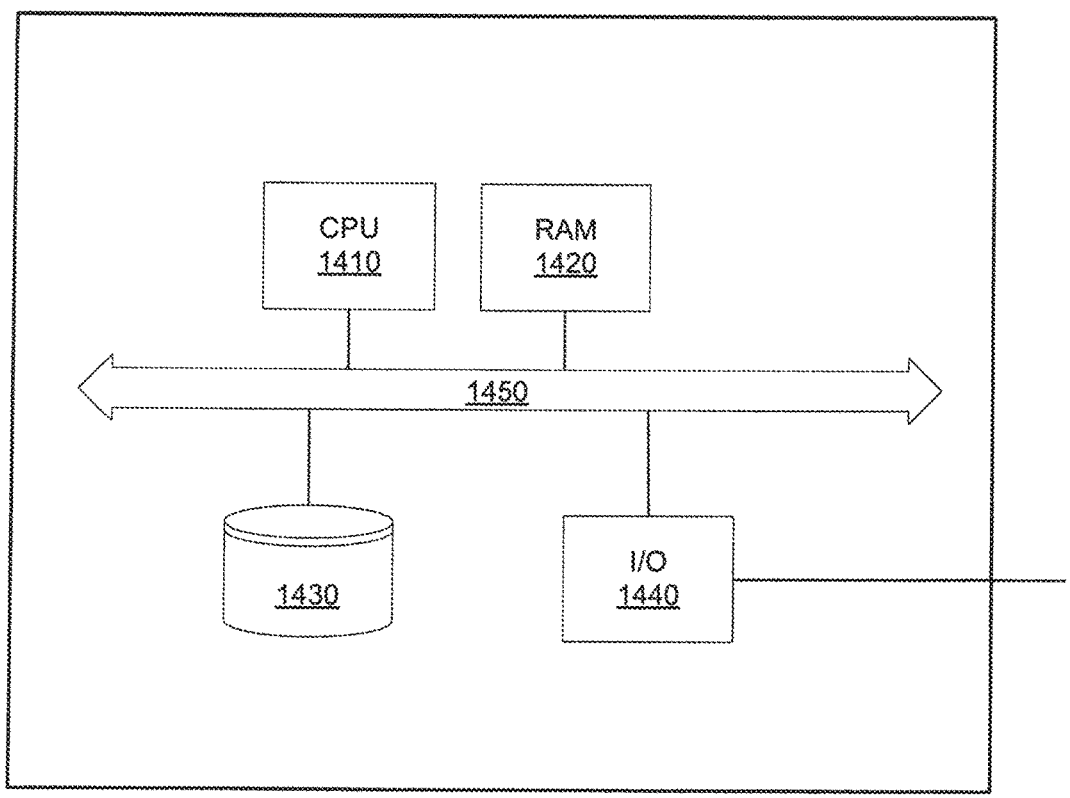
FIG. 14 illustrates an embodiment of a hardware configuration for implementing aspects of the invention.

The invention may be implemented in hardware, software, or combinations of hardware and software. FIG. 14 illustrates a block diagram of an example hardware embodiment of the computer 310 and/or the server 330. The example hardware embodiment includes an arithmetic processor (CPU) 1410, a random access memory (RAM) 1420, a memory 1430, an input/output interface (I/O) 1440, and a bus 1450. The CPU 1410 comprises any well-known arithmetic processor. The RAM 1420 comprises any well-known random access memory configured to store software programs for execution by the CPU 1410. The memory 1430 is configured to store software programs thereon that, when executed by the CPU 1410, direct the CPU 1410 to execute various aspects of the invention described above. As a non-limiting example group, the memory 1430 may comprise one or more of an optical disc, a magnetic disc, a semiconductor or solid state memory (i.e., a flash based memory), a magnetic tape memory, a removable memory, or other well-known memory means for storing software programs. The I/O 1440 comprises, for example, device input interfaces, device output interfaces, and network input and output interfaces for communicatively and electrically coupling the computer 310 or the server 330 to external devices and networks. The bus 1450 is configured to electrically couple the CPU 1410, the RAM 1420, the memory 1430, and the I/O 1440, for the transfer of data and instructions among the CPU 1410, the RAM 1420, the memory 1430, and the I/O 1440. In operation, the CPU 1410 is configured to load software programs stored on the memory 1430, or memories accessible via the I/O 1440, to the RAM 1420. The CPU 1410 is further configured to, based on an execution of the software programs, implement various aspects of the invention described above Although embodiments of the invention have been described above in detail, the above descriptions are provided only as examples. That is, it should be appreciated that many aspects of the invention described above were described by way of example only and were not intended as being required or essential elements unless explicitly stated otherwise. Various modifications of, and equivalent steps corresponding to the disclosed aspects of the above-describe embodiments, may be made by a person having ordinary skill in the art without departing from the spirit and scope of the invention defined in the following claims, the scope of which is to be accorded the broadest interpretation so as to encompass such modifications and equivalent structures.

What is claimed is:

1. An apparatus, comprising:
a processor;
a non-transitory computer-readable medium; and
stored instructions translatable by the processor to perform:
displaying a client-side scripted virtual fax machine within a network browser on a display of the apparatus, the client-side scripted virtual fax machine having a send paper tray and a send button;
responsive to user interaction with the send paper tray of the client-side scripted virtual fax machine displayed within the network browser, attaching or associating an electronic document to a fax;
responsive to user selection of the send button to send the fax to at least one fax number through the client-side scripted virtual fax machine displayed within the network browser, encoding the electronic document for transmission; and
transmitting the electronic document encoded for the transmission to the at least one fax number.

2. The apparatus of claim 1, further comprising:
a packet-switched interface coupled to a packet-switched data network;
wherein the stored instructions are further translatable by the processor to perform:
encoding the electronic document to a first form suitable for transmission over the packet-switched data network via the packet-switched interface; and
transmitting the electronic document encoded in the first form over the packet-switched data network to a server;
wherein the server routes the electronic document encoded in the first form to a facsimile service; and
wherein the facsimile service transcodes the electronic document to a second form suitable for transmission over a public switched telephone network to a fax machine having a fax number of the at least one fax number.

3. The apparatus of claim 1, further comprising:
a packet-switched interface coupled to a packet-switched data network;
wherein the stored instructions are further translatable by the processor to perform:
encoding the electronic document to a form suitable for transmission over a public switched telephone network; and
transmitting the electronic document encoded in the form over the packet-switched data network to a server;
wherein the server routes the electronic document encoded in the form to a facsimile service; and
wherein the facsimile service transmits the electronic document encoded in the form over the public switched telephone network to a fax machine having a fax number of the at least one fax number.

4. The apparatus of claim 1, further comprising:
a public switched telephone network (PSTN) interface coupled to a PSTN;
wherein the stored instructions are further translatable by the processor to perform:
encoding the electronic document to a form suitable for transmission over the PSTN; and
transmitting the electronic document encoded in the form via the PSTN interface to a fax machine having a fax number of the at least one fax number.

5. The apparatus of claim 1, further comprising:
a website host service configured to host web pages and scripts associated with the client-side scripted virtual fax machine stored on the non-transitory computer-readable medium.

6. The apparatus of claim 5, further comprising:
a public switched telephone network (PSTN) interface coupled to a PSTN;
wherein the instructions are further translatable by the processor to perform:
encoding the electronic document, as directed by the web pages and scripts associated with the client-side scripted virtual fax machine, to a form suitable for transmission over the PSTN via the PSTN interface to a fax machine having a fax number of the at least one fax number.

7. The apparatus of claim 1, further comprising:
a packet-switched interface coupled to a packet-switched data network;
wherein the network browser is configured to interpret and display web pages received from a network host service of a server over the packet-switched data network via the packet-switched interface; and
wherein the script engine is configured to interpret, execute, and display scripts embedded in the web pages received from the server and standalone scripts provided by the server.

8. The apparatus of claim 7, wherein
hypertext markup language portions of the web pages are interpreted and displayed directly by the network browser; and
scripted portions of the web pages and the scripts are interpreted, executed, and displayed by the script engine.

9. The apparatus of claim 1, further comprising:
a packet-switched interface coupled to a packet-switched data network;
wherein responsive to a user directing the network browser to access web pages and scripts that are associated with the client-side scripted virtual fax machine and that are stored on a server, the network browser receives from a network host service of the server a copy of the web pages and scripts associated with the client-side scripted virtual fax machine over the packet-switched data network via the packet-switched interlace.

10. The apparatus of claim 1, wherein the web pages and scripts associated with the client-side scripted virtual fax machine are accessible using the network browser via a Uniform Resource Locator that specifies a location of the web pages and scripts associated with the client-side scripted virtual fax machine on the Internet.

11. A computer program product comprising a non-transitory computer-readable medium storing instructions translatable by a processor to perform:
displaying a client-side scripted virtual fax machine within a network browser on a display, the client-side scripted virtual fax machine having a send paper tray and a send button;
responsive to user interaction with the send paper tray of the client-side scripted virtual fax machine displayed within the network browser, attaching or associating an electronic document to a fax;

responsive to user selection of the send button to send the fax to at least one fax number through the client-side scripted virtual fax machine displayed within the network browser, encoding the electronic document for transmission; and transmitting the electronic document encoded for the transmission to the at least one fax number.

12. The computer program product of claim 11, wherein the instructions are further translatable by the processor to perform:

encoding the electronic document to a first form suitable for transmission over a packet-switched data network; and transmitting the electronic document encoded in the first form over the packet-switched data network to a server;

wherein the server routes the electronic document encoded in the first form to a facsimile service; and wherein the facsimile service transcodes the electronic document to a second form suitable for transmission over a public switched telephone network to a fax machine having a fax number of the at least one fax number.

13. The computer program product of claim 11, wherein the instructions are further translatable by the processor to perform:

encoding the electronic document to a form suitable for transmission over a public switched telephone network; and transmitting the electronic document encoded in the form over a packet-switched data network to a server;

wherein the server routes the electronic document encoded in the form to a facsimile service; and wherein the facsimile service transmits the electronic document encoded in the form over the public switched telephone network to a fax machine having a fax number of the at least one fax number.

14. The computer program product of claim 11, wherein the instructions are further translatable by the processor to perform:

encoding the electronic document to a form suitable for transmission over a public switched telephone network; and transmitting the electronic document encoded in the form over the public switched telephone network to a fax machine having a fax number of the at least one fax number.

15. The computer program product of claim 11, wherein the non-transitory computer-readable medium further stores a website host service configured to host web pages and scripts associated with the client-side scripted virtual fax machine stored on the non-transitory computer-readable medium.

16. The computer program product of claim 15, wherein the instructions are further translatable by the processor to perform:

encoding the electronic document, as directed by the web pages and scripts associated with the client-side scripted virtual fax machine, to a form suitable for transmission over a public switched telephone network to a fax machine having a fax number of the at least one fax number.

17. The computer program product of claim 11, wherein the network browser is configured to interpret and display web pages received from a network host service of a server over a packet-switched data network; and the script engine is configured to interpret, execute, and display scripts embedded in the web pages received from the server and standalone scripts provided by the server.

18. The computer program product of claim 17, wherein hypertext markup language portions of the web pages are interpreted and displayed directly by the network browser; and scripted portions of the web pages and the scripts are interpreted, executed, and displayed by the script engine.

19. The computer program product of claim 11, wherein responsive to a user directing the network browser to access web pages and scripts that are associated with the client-side scripted virtual fax machine and that are stored on a server, the network browser receives from a network host service of the server a copy of the web pages and scripts associated with the client-side scripted virtual fax machine over a packet-switched data network.

20. The computer program product of claim 11, wherein the web pages and scripts associated with the client-side scripted virtual fax machine are accessible using the network browser via a Uniform Resource Locator that specifies a location of the web pages and scripts associated with the client-side scripted virtual fax machine on the Internet.

* * * * *